Figure 1:
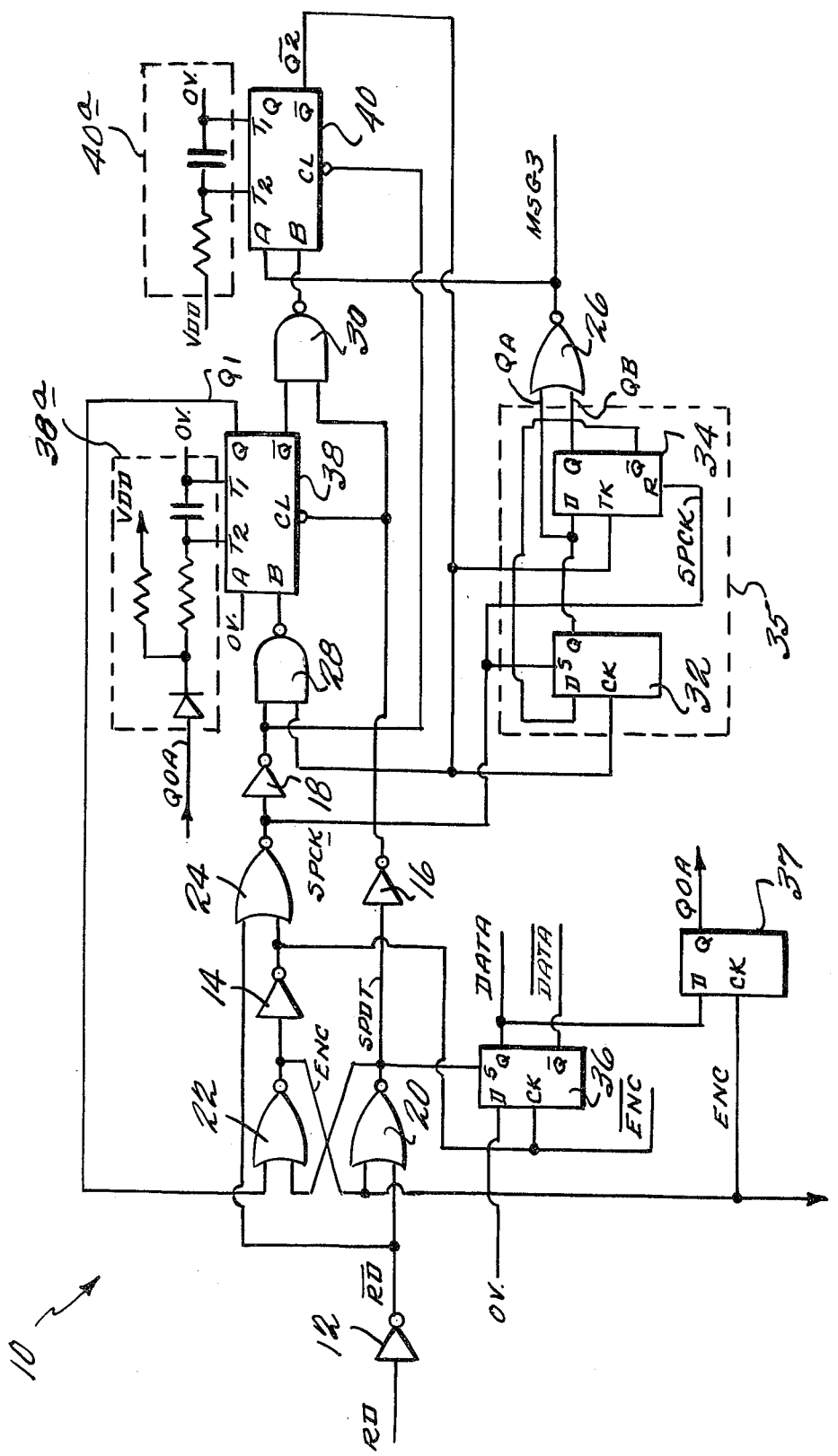

United States Patent [19]

Hewlett, Jr.

[11] 4,133,978
[45] Jan. 9, 1979

[54] CIRCUIT FOR SEPARATING A COMPOSITE STREAM OF DATA AND CLOCK PULSES

[75] Inventor: Clarence W. Hewlett, Jr., Waynesboro, Va.

[73] Assignee: General Electric Company, Waynesboro, Va.

[21] Appl. No.: 827,669

[22] Filed: Aug. 25, 1977

[51] Int. Cl.² .................... H04J 3/06; H04L 7/02
[52] U.S. Cl. .................... 179/15 BS; 178/69.1; 340/146.1 D
[58] Field of Search .................... 179/15 BS; 178/69.1; 340/146.1 D

[56] References Cited

U.S. PATENT DOCUMENTS

| 3,144,515 | 8/1964 | Kaneko | 179/15 BS |
| 3,646,451 | 2/1972 | Shoap | 328/63 |
| 3,733,585 | 5/1973 | Merlo | 340/146.1 D |

*Primary Examiner*—Thomas W. Brown
*Attorney, Agent, or Firm*—Michael Masnik

[57] ABSTRACT

A method and apparatus for generating separated data and clock pulse trains from a composite pulse train of interspersed data and clock pulses where a predetermined number of successive clock pulses are absent from predetermined segments of the composite pulse stream. In the preferred exemplary embodiment, the first encountered pulse in the composite pulse stream is passed to a separated clock pulse train. Pulses thereafter occurring during subsequent alternating periodic time intervals are passed to the data pulse stream and to the clock pulse stream, respectively. Absences or non-occurrences of clock pulses in the resultant separated clock pulse stream are detected and counted. After counting a predetermined number of non-occurrences clock pulses in the separated clock pulse stream, the circuit is reset and all of the above recited steps are repeated. An exemplary circuit utilizing a plurality of interconnected monostable multivibrators for accomplishing such data separation is disclosed.

43 Claims, 3 Drawing Figures

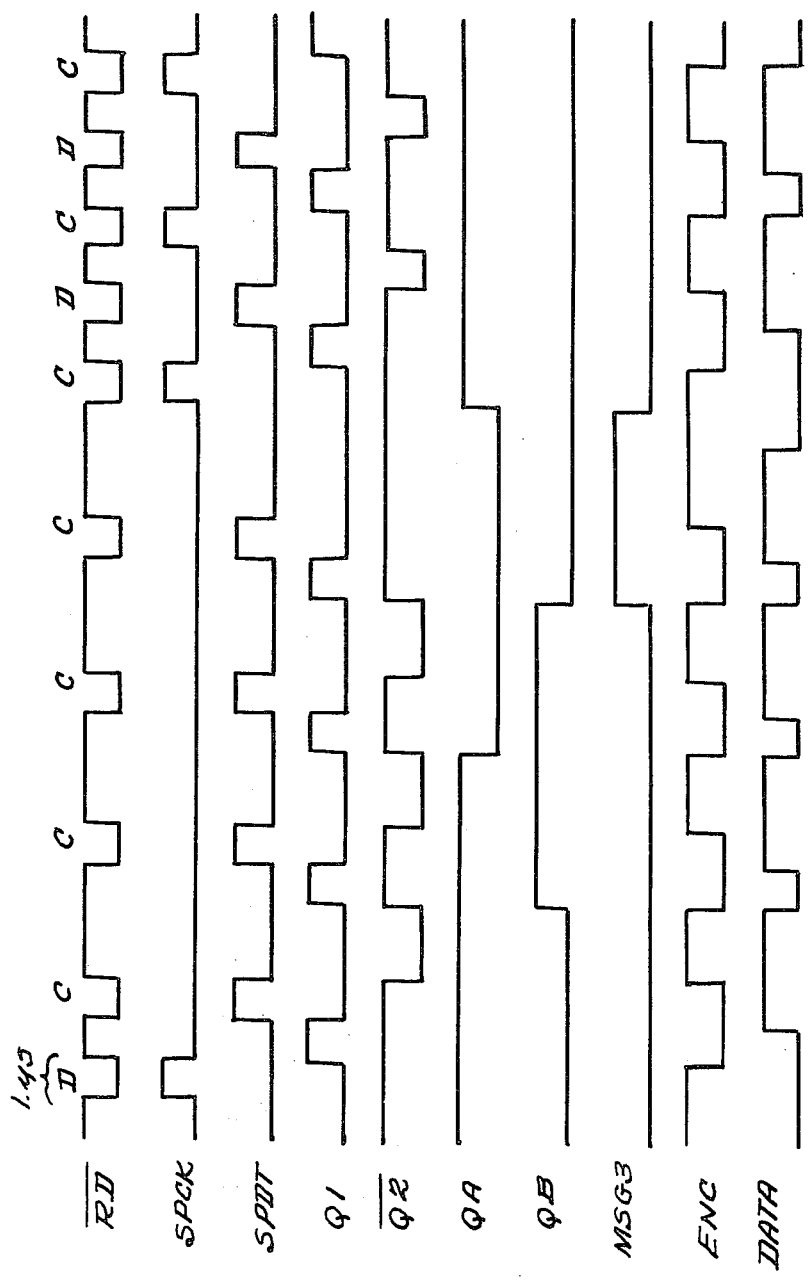

CIRCUIT FOR SEPARATING A COMPOSITE STREAM OF DATA AND CLOCK PULSES

BACKGROUND OF THE INVENTION

Many presently marketed data processing systems have adopted a data format wherein data bits and clock bits are interspersed in a composite serial bit stream. For example, the data may be presented in sequential time intervals (or "bit cells") defined by two clock pulses, with the presence or absence of a pulse between the clock pulses determining the bit cell value. While the clock pulses normally recur at a predetermined rate, predetermined sequences of absent clock pulses are often used as headers to identify the beginning of various fields in the data. There is, however, generally a predetermined maximum number of successive absent clock pulses in such headers.

An example of such a data format is that used in systems compatible with the so-called IBM 3740 data entry system. The IBM 3740 system utilizes diskettes including an index track, a plurality of data tracks, alternate tracks and spare tracks. Each of the tracks is divided into a plurality of sectors or fields. The data within the fields, grouped in bytes, consists of eight consecutive bit cells, the bit cells being time intervals defined by the nominal clock rate. The clock pulses normally recur at 250 Khz, and except during predetermined portions of the header, as will be described, are always present.

Each field in a track is conventionally separated from adjacent fields by "gaps," comprising a predetermined number of bytes comprising all zeros or ones, followed by a predetermined number of bytes comprising all zeros. Address marks are used to identify the beginning of ID and data fields and to synchronize separation and deserializing circuitry with the first byte of each field. Such address marks include unique byte sequences of data and clock pulses. The patterns generally include bit cells having non-occurrences or absences of clock pulses, but the maximum predetermined number of successive absent clock pulses is conventionally three. An index address mark is conventionally located at the beginning of each track comprising a fixed number of bytes in front of the first record. An ID address mark byte is also conventionally located at the beginning of each ID field on the diskette and a data address mark byte is located at the beginning of each data field on the diskette.

Data separation circuitry is utilized to generate, from the composite signal of interpersed clock and data pulses, separated data and clock pulse streams. Such data separation circuitry must be operated in synchronization with the phase of the composite pulse stream, lest the data and clock pulse streams be erroneously interchanged. Various prior systems have depended upon the presence of appropriate gaps to synchronize the data separation circuit with the composite signal. Some such systems interchange the separate bit streams upon detection of a missing pulse in the separated clock pulse stream, utilizing a single monostable multivibrator to establish the bit cell period. Multiplexing schemes are then used in such systems to prevent loss of data. Such schemes, however, require relatively complex circuitry and are generally inadequate. A second monostable is sometimes used in such systems to establish a second bit cell period. One monostable or the other is fired in accordance with the data value of the preceding bit cell to improve the error margin of the system.

Other prior systems have used phase locked loops to provide data separation, the flywheel effect of the phase locked loops maintaining synchronization through sequences of absent clock pulses. These systems, however, generally require relatively lengthy periods to establish synchronization and, further, are slow to respond to timing changes in the composite signal.

Now, however, a data separator has been discovered which avoids such problems by reiterative use of a unique digital algorithm. In the exemplary embodiment to be described below, the next encountered pulse in the composite stream is passed to the clock pulse stream. Pulses from the composite pulse stream occurring during subsequent alternating periodic time intervals are passed to the data pulse stream and to the clock pulse stream, respectively. Absences of clock pulses in the resultant separated clock pulse stream are detected and counted and the above recited steps are repeated after detecting the predetermined number of absences of clock pulses. These and other or similar special techniques and circuitry are preferably included in use of this invention so as to provide separation of the composite bit streams with improved technical and economic criteria.

Figure 2:
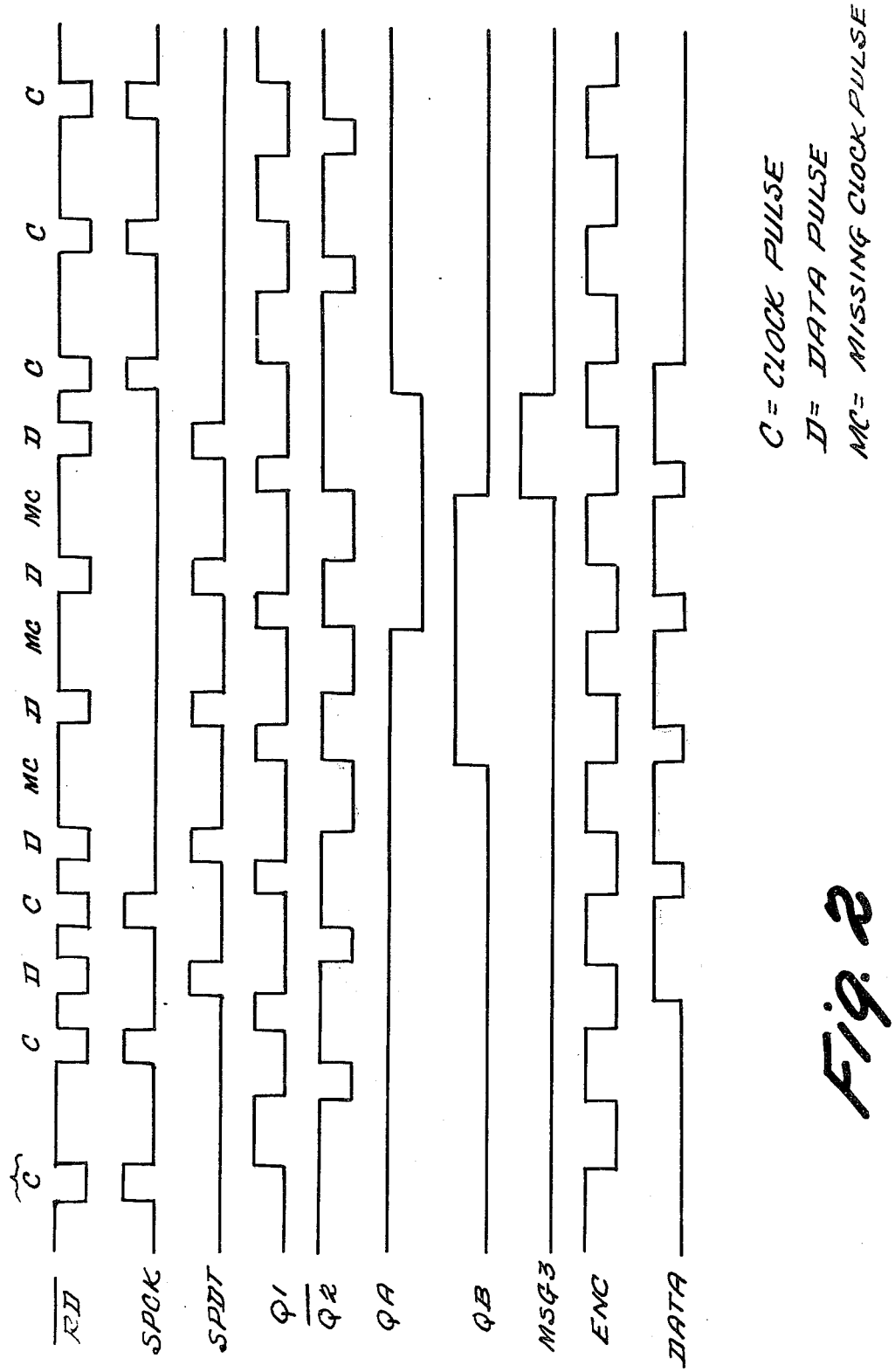

A presently preferred exemplary embodiment of the present invention will now be described in detail with reference to the accompanying drawings wherein:

FIG. 1 is a schematic diagram of an exemplary data separation circuit embodying the present invention; and FIGS. 2 and 3 are timing diagrams of various signals associated with the circuit of FIG. 1.

Referring now to FIG. 1, a data and clock separator circuit 10 embodying the present invention comprises conventional inverters 12, 14, 16 and 18; 2-input NOR gates 20, 22, 24 and 26; 2-input NAND gates 28 and 30; D-type flip-flops 32, 34, 36 and 37; and retriggerable, resettable monostable multivibrators 38 and 40, suitably Motorola MC14528 dual retriggerable/resettable monostable multivibrators.

As is well known in the art, a NOR gate generates a high logic (one) output signal only when all input signals are concurrently at low logic (zero) levels. Conversely, a NAND gate generates a low logic (zero) level output signal only when all input signals are concurrently high logic (one) value. As is also well known in the art, D-type flip-flops generate high (one) and low (zero) logic level Q output signals respectively in response to high logic level signals applied to set (S) and reset (R) input terminals, and generate a Q output signal in accordance with the logic level applied to a D input terminal at the time of a positive going transition applied to a clock (CL) input terminal.

Monostable multivibrators 38 and 40 each have A, B, T1, T2 and clear (CL) input terminals and Q and $\overline{Q}$ output terminals. Monostables 38 and 40 generate pulses in response to negative transitions applied to the B input terminal when the A input terminal has applied a low logic level signal, and in response to positive going transitions applied to the A input terminal when a high logic level signal is applied to the B input. The pulses are of a duration in accordance with the instantaneous time constant of respective timing circuits 38a and 40a connected to the respective T1, T2 input terminals. Such monostables are inhibited during periods where a high logic (one) level signal is applied to the A input, and are reset (cleared) in response to a low logic level applied to input CL.

The elements of circuit 10 are interconnected as follows. The composite signal RD of interspersed data and clock pulses (hereinafter also referred to as the "raw data signal") is applied to inverter 12 to provide a high level signal in the absence of a pulse. The inverted raw data signal $\overline{RD}$ is applied to one input each of NOR gates 20 and 24, the other input terminals of NOR gates 20 and 24 being coupled to the output terminal of NOR gate 22, and through inverter 14 to the output terminal of NOR gate 22, respectively. The input terminals of NOR gate 22 are respectively receptive of the output signal (SPDT) or NOR gate 20 and the Q output signal (Q1) of monostable 38. Output signal SPDT of NOR gate 20 is applied through inverter 16 to the clear input (CL) of monostable 38 and to one input of NAND gate 30, respectively, the other input terminal of NAND gate 30 being receptive of the $\overline{Q}$ output signal ($\overline{Q1}$) of monostable 38. The output signal SPCK of NOR gate 24 is applied to the set input terminal of flip-flop 32, the reset input terminal of flip-flop 34 and, through inverter 18, to one input terminal of NAND gate 28 and to the clear (CL) input terminal of monostable 40, respectively. The other input terminal of NAND gate 28 is receptive of the $\overline{Q}$ output signal ($\overline{Q2}$) of monostable 40, signal $\overline{Q2}$ also being applied to the receptive clock inputs of flip-flops 32 and 34.

The B input terminals of monostables 38 and 40 are respectively receptive of the output signals of NAND gates 28 and 30. Flip-flops 32 and 34 are interconnected such that the Q output terminal of flip-flop 32 is coupled to the D input terminal of flip-flop 34, and the $\overline{Q}$ output terminal of flip-flop 34 is coupled to the D input terminal of flip-flop 32. NOR gate 26, having input terminals respectively coupled to the Q output terminals of flip-flops 32 and 34, is coupled at its output terminal to input A of monostable 40. Input A of monostable 38 is tied low, that is, connected to a source at the zero logic level (here zero volts). Flip-flop 36 is respectively clocked by the inverted output signal ($\overline{ENC}$) of NOR gate 22 and set by the output signal of NOR gate 20. The D input thereof is tied low. The Q output of flip-flop 36 is applied to the D input of flip-flop 37, flip-flop 37 being clocked by the output signal (ENC) of NOR gate 22.

Briefly, NOR gates 20 and 24 operate as pulse gating means to selectively pass pulses from the composite signal to separated data (SPDT) or clock (SPCK) streams. Monostables 38 and 40, NAND gates 28 and 30 and NOR gate 22 cooperate as a control circuit to selectively enable NOR gates 20 and 24, such that the first encountered composite signal pulse is routed to the separated clock stream, and pulses occurring in successive alternating half-bit cells are routed to the separated data and clock streams, respectively. Flip-flops 32 and 34 and NOR gate 26 cooperate to detect the predetermined number of missing clock pulses, and generate a signal, after the occurrence of such maximum number, to inhibit the control circuit or, in effect, to reset circuit 10 to a quiescent state.

To effect such selective enabling of gates 20 and 24, monostables 38 and 40 generate a mutually exclusive "data window" and "clock window" in their respective output signals of durations approximately equal to one-half a bit cell or one-half of the period of the nominal clock frequency. Monostable 38 output signal Q1 effectively controls the state of NOR gate 22 output signal ENC, the data window inhibiting gate 22. The state of signal ENC determines whether a given pulse in composite signal RD will be assigned to the separated clock or separated data pulse stream. Where ENC is high, a pulse will be assigned to the separated clock stream (SPCK); where ENC is low, the pulse is assigned to the data stream (SPDT). In the quiescent state wherein both monostables 38 and 40 have, in effect, timed out (have low logic value Q output signals), ENC maintains a high logic value. The first encountered composite signal pulse is thus passed to the separated clock pulse stream SPCK. Thereafter, alternate triggering of monostables 38 and 40 route pulses in successive alternate half-bit cells to the separated data SPDT and clock SPCK streams, respectively.

Flip-flops 32 and 34 together comprise a counter 35 which is reset by the occurrence of a clock pulse to a predetermined number, then decremented by each successive missing clock pulse such that, in cooperation with NOR gate 26, a logic high-level output signal is generated upon the occurrence of a predetermined number (here 3) of successive absences of clock pulses to inhibit the alternate triggering of monostables 38 and 40 and effectively reset circuit 10 to the quiescent state. If circuit 10 is out of phase with composite signal RD, such resetting will operate to provide synchronization as will be explained.

To provide for retiming of circuit 10 upon each composite signal pulse, monostables 38 and 40 are made responsive not only to the output signal of the other monostable, but to the respective separated clock and data signals as well. Monostable 38 is triggered upon the concurrence of low logic values in the separated clock signal and the output signal Q2 of monostable 40. The data window is terminated by the first occurring of a pulse in the separated data stream (SPDT) or the end of the period defined by timing circuits 38a. Monostable 40 is triggered to generate the clock window in signal Q2 upon the concurrence of a low logic value in separated data stream SPDT and low value in signal Q1. The clock window in signal Q2 is terminated in response to the first occurring of a pulse in separated clock signal SPCK and the timing out of the time period defined by timing circuit 40a. Such a triggering scheme provides for retiming of the circuit 10 upon the last encountered pulse, as will be explained.

With reference now to FIGS. 1, 2 and 3, the operation of circuit 10 will be more specifically described. Where circuit 10 is in the quiescent state, monostables 38 and 40 have both timed out, Q1 is low, the separated data and clock signals SPDT and SPCK are low (no data is applied) and the output signal ENC of NOR gate 22 is therefore high. The first occurring pulse in composite signal RD causes a low-level signal to be applied to one input of NOR gate 20. Since ENC is high in the quiescent state, the output SPDT or NOR gate 20 therefore remains low and the output SPCK of NOR gate 24 goes high. Thus, the first encountered pulse in composite signal RD is passed to the separated clock signal SPCK. The high logic level in SPCK resets (initializes) missing clock pulse counter 35 and, after inversion by inverter 18, clears monostable 40. Clock window Q2 is thus low (although initially low in any event because of the quiescent state) and $\overline{Q2}$ is high. Thus, NAND gate 28 provides a negative going transition to trigger monostable 38 into generating data window Q1 in response to the negative going transition of the pulse in SPCK.

The data window is thus generated immediately after the termination of the pulse passed to SPCK. As data window Q1 goes high, the output of NOR gate 22 ENC goes low. Accordingly, if a pulse is received during the duration of the data window in signal Q1, the pulse will be passed through the output of NOR gate 20 to separated data signal SPDT. The positive transition in SPDT sets flip-flop 36 and clears monostable 38. Thus, a negative transition in the output signal of NAND gate 30 is generated upon the trailing edge of the SPDT pulse, to trigger the clock window in monostable 40 output Q2 (causing $\overline{Q2}$ to go low). Alternatively, if no data pulse occurs during the bit cell, the signal SPDT remains low, providing for the generation of a trigger signal to monostable 40 by NAND gate 30 upon the timing out of the data window in Q1 at the end of the period established by timing circuit 38a (approximately one-half the nominal bit cell period). Thus, monostable 38 operates as a substitute timer for triggering monostable 40 in the event that no data pulse is present. The clock window in signal Q2 is, therefore, generated after the occurrence of data pulse, or at the end of half a bit cell period established by timing circuit 38a.

As monostable 40 is triggered to provide the clock window, a transition also occurs in output signal ENC or NOR gate 22. ENC goes high in response to concurrent low-level values in signals Q1 and SPDT, and signal Q1 assumes a low-level value in response to the leading edge of pulses SPDT, or due to timing out in the event that no data pulse occurs. Signal ENC thus goes high in response to either the trailing edge of a pulse in SPDT or, in the event that there is no data pulse, the termination of the data window. If a pulse occurs during a period while Q1 is of a low logic level, NOR gate 20 is inhibited and the pulse is passed through NOR gate 24 to signal SPCK. Again, the leading edge of the SPCK clock pulse resets (initializes) counter 35 and, after inversion by inverter 18, clears monostable 40. The positive level in $\overline{Q2}$ provides for the generation of a triggering signal to monostable 38 by NAND gate 28 upon the trailing edge of the clock pulse. In the event that no clock pulse occurs during the period defined by timing circuit 40a, the clock window times out, the resultant positive going transition clocks flip-flops 32 and 34 and (recalling that no clock pulse occurred thus leaving SPCK low) causes the generation of a negative going transition in the output of NAND gate 28 to trigger monostable 38 and repeat the cycle. Therefore assuming that clock pulses are not absent from three successive nominal periods of SPCK, circuit 10 operates to assign the first encountered pulse to the clock pulse stream, then assigns pulses occurring during successive alternate half-bit cells to the data and clock pulse streams, respectively. As noted above, clearing monostables 38 and 40 in response to the leading edges of the data and clock pulses, respectively, provides for re-calibration of the circuit timing by the latest pulse actually received. Thus, even where three successive clock pulses are absent in an address mark, data pulses present solidify circuit timing, making it unnecessary to rely on the flywheel ability of the circuit to maintain its own timing.

As noted above, no more than a predetermined number (3) of successive clock pulses can properly be absent from the separated clock signal SPCK. More than such predetermined number of absent clock pulses in SPCK indicates that a phase error exists and that the data and pulse streams are interchanged. Flip-flops 32 and 34 cooperate with NOR gate 26 to generate a high-level signal upon detection of three successive absences of clock pulses to inhibit monostable 40 and return circuit 10 to the quiescent state at the end of the instantaneous bit cell (as then viewed by circuit 10). The next pulse in composite signal RD, after the end of the bit cell, is assigned to the separated clock pulse stream SPCK. If such next pulse occurs in the immediately successive half-bit cell, the cycle continues uninterrupted. However, if circuit 10 is out of synchronization and no pulse occurs in the immediately successive half-bit cell, the alternating half-bit cell cycle is interrupted and shifted to re-establish synchronization.

More specifically, flip-flop 32 is set and flip-flop 34 reset by the leading edge of clock pulses SPCK. The flip-flops are also immediately thereafter clocked by the positive going transition in $\overline{Q2}$ due to the clearing of monostable 40 by the leading edge of the clock pulse after inversion by inverter 18. However, the clocking occurs during the application of a high-level signal to the respective set and reset inputs and therefore is ineffectual. Thus, the Q outputs of flip-flops 32 and 34 initially maintain high and low logic values, respectively. Each time a clock pulse occurs, flip-flops 32 and 34 are thus initialized to respective high and low logic Q outputs. However, where no clock pulse occurs during a given clock window, flip-flops 32 and 34 are clocked by the positive going transition in $\overline{Q2}$, causing flip-flop 32 to assume the previous $\overline{Q}$ value of flip-flop 34 and flip-flop 34 to assume the previous Q value of flip-flop 32. Thus, at the end of the first clock window during which no clock pulse occurs, flip-flops 32 and 34 both assume high logic Q values. If no clock pulse has occurred prior to the end of the next successive clock window, the flip-flops 32 and 34 assume low and high values, respectively. If a third clock window passes without an intervening clock pulse, flip-flops 32 and 34 both assume low-level Q outputs and an inhibit signal is generated by NOR gate 26 to monostable 40. The inhibit signal continues until the next successive pulse in separated clock pulse stream SPCK. Thus, flip-flops 32 and 34 comprise a counter which is set to the predetermined number upon detection of the first absent of a clock pulse and is decremented in response to each successive missing clock pulse and, if not reset before reaching zero, causes the generation of the inhibit signal to monostable 40.

FIGS. 2 and 3, respectively, illustrate the situation where circuit 10 is in phase with the composite signal RD and three absent clock pulses in an address are detected and the situation where circuit 10 is out of phase with the composite signal RD and the data and clock streams are interchanged. It should be noted that the same positive transition in Q2 that clocked flip-flops 32 and 34, prompting the generation of the inhibit signal, initiated the application of a triggering signal to monostable 38. Thus, any pulse occurring during the data window is assigned to the data pulse stream SPDT. The data window is either terminated by the occurrence of a data pulse, or by timing out, and a negative going transition in the output signal of NAND gate 30 occurs. However, the signal applied to terminal A of monostable 40 inhibits triggering of the clock window. Q2 is thus maintained at a high level and circuit 10 reverts to the quiescent state. Thus, the next occurring pulse in composite signal RD is assigned to the clock pulse stream SPCK. If circuit 10 is in phase with composite signal RD, a clock pulse will occur in the next successive bit cell and the circuit operation will be unchanged. If no clock signal occurs during the next successive bit cell, it is apparent that circuit 10 is out of phase and the next pulse to occur is assigned to the separate clock pulse stream.

It has been found that the effect of closely spaced pulses in displacing each other from their nominal positions can be accounted for, and the error margin thereby improved, by generating data windows of different durations depending upon whether the previous bit cell was of high or low value. Accordingly, a timing circuit 38a can be utilized which presents one of two timing constants in accordance with the previous bit cell content. For example, a diode can be biased by a signal indicative of the previous bit cell content, to selectively short out, in effect, one of a plurality of resistors and thereby change the time constant of timing circuit 38a.

Flip-flops 36 and 37 operate to provide such a bias signal to timing circuit 38a. Flip-flop 36 is set in response to positive going transitions in separate signal SPDT and effectively reset in response to negative going transitions in the output signal of NOR gate 22 ENC. The resultant Q output is a signal having positive going transitions in accordance with SPDT but with pulses of increased duration. Flip-flop 37 is loaded with the data value from the Q output of flip-flop 36 in response to positive going transition in signal ENC (occurring at the end of the data window). The Q output of the flip-flop 37 is thus delayed by one cycle with respect to the separate data signal as reflected in the Q output of flip-flop 36.

It is often convenient to use data and pulse trains with pulses of greater duration than those in composite signal RD. Accordingly, the Q output signal of flip-flop 36 can be utilized as the separated data signal. Similarly, signal ENC provides a regular clock signal, having pulses which go low in accordance with the trailing edge of pulses in SPCK and return high at the beginning of each clock window. Such pulses recur at regular intervals in accordance with the nominal rate of clock pulses (every four microseconds where the clock pulses are at a 250 Khz rate) and recur even when SPCK pulses are missing due to address marks.

It will be understood that the above description is of illustrative embodiments of the present invention and that the invention is not limited to the specific form shown. Modifications may be made in the design and arrangement of the elements without departing from the spirit of the invention, as will be apparent to those skilled in the art. It should be apparent that while the description has been in terms of clock and data pulses, the present invention can be applied to any system wherein pulses indicative of different informational categories are effectively time multiplexed into a serial bit stream and wherein a predetermined sequence of bits occurs only in one of the informational categories.

What is claimed is:

1. A method of separating into a data pulse stream and a clock pulse stream serially occurring electrical pulses from a composite pulse stream of serially occurring interspersed data and clock pulses, said composite pulse stream including clock pulses normally occurring during time intervals which recur at a regular nominally periodic rate except during a predetermined number of such time intervals wherein such clock pulses may not be present, said method comprising the steps of:
   first passing the next encountered pulse in said composite pulse stream to the clock pulse stream;
   subsequently passing pulses from the composite pulse stream occurring during subsequent alternating recurrent time intervals to said data pulse stream and to said clock pulse stream respectively;
   detecting and counting the number of non-occurrences of clock pulses in the resulting clock pulse stream;
   after detecting and counting the number of non-occurrences of clock pulses in said predetermined number of time intervals, repeating all of the above-recited steps.

2. A method of separating into a first pulse stream and a second pulse stream serially occurring electrical pulses from a composite pulse stream of serially occurring pulses, said composite pulse stream including first pulses normally occurring during time intervals which recur at a regular nominally periodic rate except during a predetermined number of such time intervals wherein such first pulses may not be present, and second pulses interspersed with said first pulses, said method comprising the steps of:
   passing the next occurring pulse from said composite pulse stream to said first pulse stream;
   passing subsequent pulses occurring during subsequent alternating recurrent time intervals from the composite pulse stream to the second stream and to said first pulse stream respectively;
   detecting and counting the number of non-occurrences of pulses in the resulting first pulse stream;
   upon detecting and counting the number of non-occurrences of pulses in said predetermined number of time intervals, thereafter repeating all of the above-recited steps.

3. A method as in claim 2 wherein said repetition of steps begins at a subsequent time when a pulse in the first pulse stream would have been expected by the timing sequence already defined by the just preceding operation of the recited steps.

4. A method as in claim 2 wherein said time intervals occurring at a recurrent rate are referenced in time to the occurrence of the last occurring pulse in the composite pulse stream.

5. A method as in claim 2 wherein said time intervals occurring at a recurrent rate are referenced in time to the occurrence of pulses in at least one of said pulse streams.

6. A method of separating a composite serial pulse stream of clock and data pulses into a separate clock pulse stream and a separate data pulse stream wherein said composite pulse stream comprises successive bit cell time intervals, each bit time interval including a clock cell time interval and a data cell time interval, all such time intervals recurring at a nominal periodic rate and wherein clock pulses are normally present during all but a predetermined number of clock cell time intervals, said method comprising the steps of:
   passing the next encountered pulse from the composite pulse stream to the clock pulse stream thereby defining the relative timing of successive clock and data cell time intervals with respect to the composite pulse stream;
   passing subsequently encountered pulses from the composite pulse stream to the data pulse stream and to the clock pulse stream depending upon their occurrence during the data cell and clock cell time intervals respectively as defined in the first-recited passing step above;
   counting the number of non-occurrences of clock pulses from the resulting clock pulse stream; and upon counting the number of non-occurrences of clock pulses from said predetermined number of clock cells and after the next immediately occurring data cell time interval, repeating all the above-recited steps.

7. A method as in claim 6 wherein the occurrences of said clock and data cell time intervals is referenced in time to the occurrence of pulses in at least one of the pulse streams.

8. A method as in claim 6 wherein any pulse occurring during the data cell time interval next immediately occurring after counting the predetermined number of non-occurrences of clock pulses is passed to the data pulse stream.

9. The method of claim 6 wherein said repeating step is effected at the end of the bit cell interval in which said predetermined number of absences of clock pulses is detected.

10. A method of separating a composite serial pulse stream into a separate first pulse stream and a separate second pulse stream wherein said composite pulse stream comprises successive bit cell time intervals, each bit cell time interval including a first cell time interval and a second cell time interval, all such time intervals recurring at a nominal periodic rate and wherein pulses are normally present during all but a predetermined number of first cell time intervals, said method comprising the steps of:
passing a pulse from the composite pulse stream to said first pulse stream thereby defining the relative timing of successive first and second cell time intervals with respect to the composite pulse stream;
passing subsequently encountered pulses from the composite pulse stream to the second pulse stream and to the first pulse stream depending upon their occurrence during the second cell and first cell time intervals respectively as defined in the first-recited passing step above;
counting the number of non-occurrences of pulses from the resulting first pulse stream;
upon counting the number of non-occurrences of pulses from said predetermined number of first cells, repeating all of the above-recited steps after a predetermined delay so as to insure synchronization of the first and second cells defined by these steps with the actual first and second cells occurring in said composite pulse stream.

11. A method as in claim 10 wherein the repetition of steps is begun at the beginning of a first cell time interval as defined by the just preceding execution of recited steps of claim 9.

12. A method as in claim 11 wherein the timing of said first and second cell time intervals is repetitively redefined by the occurrence of pulses in at least one of the pulse streams.

13. A method as in claim 10 wherein the timing of said first and second cell time intervals is repetitively redefined by the occurrence of pulses in at least one of the pulse streams.

14. The method of claim 10 wherein said repeating step is effected at the end of the bit cell interval in which said predetermined number of absences of pulses is detected.

15. A circuit for separating a composite serial pulse stream of clock and data pulses into a separate clock pulse stream and a separate data pulse stream wherein said composite pulse stream comprises successive bit cell time intervals, each bit cell time interval including a clock cell time interval and a data cell time interval, all such time intervals recurring at a nominal periodic rate and wherein clock pulses are normally present during all but a predetermined number of clock cells, and said circuit comprising:
a clock gate capable of being enabled to pass pulses from said composite pulse stream to said clock pulse stream when enabled;
a data gate capable of being enabled to pass pulses from said composite pulse stream to said data pulse stream when enabled;
a control circuit capable of being initialized to alternatively enable said clock gate and said data gate during clock cell intervals and data cell intervals respectively, the timing of said clock cell and data cell intervals being defined by a pulse from the composite pulse stream initially assigned to a predetermined one of said clock and data pulse streams, and
counter means for counting the number of non-occurrences of clock pulses in the resulting clock pulse stream and for initializing said control circuit whenever such count reaches said predetermined number.

16. A circuit as in claim 15 wherein said predetermined one of the clock and data pulse streams is the clock pulse stream and wherein said counter means is connected to re-initialize said control circuit after the next immediately occurring data cell time interval as defined by the just preceding operation of the control circuit.

17. A circuit as in claim 15 wherein said control circuit is reset to redefine the timing of said clock and data cell time intervals by the occurrence of pulses in at least one of the pulse streams.

18. A circuit as in claim 15 wherein said control circuit comprises:
a data window monostable circuit connected to cause said data gate to be enabled for one data cell time interval upon being triggered;
a clock window monostable circuit connected to cause said clock gate to be enabled for one clock cell time interval upon being triggered;
said data window monostable circuit being connected for triggering in accordance with an output from said clock window monostable circuit;
said clock window monostable circuit being connected for triggering in accordance with an output from said data window monostable circuit;
said counter means being connected to control the operation of at least one of said monostable circuits after counting said predetermined number of non-occurrences of clock pulses.

19. A circuit as in claim 18 wherein said counter means is connected to inhibit the operation of at least one of said monostable circuits after counting said predetermined number of non-occurrences of clock pulses.

20. The circuit of claim 18 further comprising means cooperating with said data window monostable circuit for varying the duration of said data cell time in accordance with the value of the preceding data cell.

21. A circuit as in claim 18 wherein said counter means is connected to be decremented for each occurring clock cell interval set to said predetermined number by each successive clock pulse appearing in the clock pulse stream whereby the control circuit is only re-initialized due to said predetermined number of successive missing clock pulses.

22. The circuit of claim 21 further comprising means cooperating with said data window monostable circuit for varying the duration of said data cell time in accordance with the value of the preceding data cell.

23. A circuit as in claim 18 further comprising:
means for enabling said clock gate in the intialized state to pass the first pulse to appear in the composite pulse train; and
said counter means is connected to inhibit the operation of said clock window monostable circuit after counting said predetermined number of non-occurrences of clock pulses.

24. A circuit as in claim 23 wherein said counter means is connected to be incremented for each occurring clock cell interval and to be reset by each successive clock pulse appearing in the clock pulse stream whereby the control circuit is only re-initialized due to said predetermined number of successive non-occurrences of clock pulses.

25. A circuit as in claim 23 wherein said counter means is connected to be decremented for each occurring clock cell interval and to be set to said predetermined number by each successive clock pulse appearing in the clock pulse stream, said counter inhibiting said at least one monostable upon reaching a zero count whereby the control circuit is only re-initialized due to said predetermined number of successive missing clock pulses.

26. A circuit as in claim 18 further comprising means for incrementing said counter means for each occurring clock cell interval reset by each successive clock pulse appearing in the clock pulse stream whereby the control circuit is only re-initialized due to said predetermined number of successive non-occurrences of clock pulses.

27. A circuit as in claim 18 wherein:
said data window monostable circuit is also connected for triggering in accordance with pulses appearing in said clock pulse stream, and
said clock window monostable circuit is also connected for triggering in accordance with pulses appearing in said data pulse stream, thereby retiming the operation of the monostable circuits to immediately follow variations in the periodicity of the bit cells occurring in the composite pulse stream.

28. A circuit as in claim 27 wherein:
said clock gate is enabled in the initialized state to pass the first pulse to appear in the composite pulse train; and
said counter means is connected to inhibit the operation of said clock window monostable circuit after counting said predetermined number of non-occurrences of clock pulses.

29. A circuit as in claim 28 wherein said counter means is connected to be incremented for each occurring clock cell interval and reset by each successive clock pulse appearing in the clock pulse stream whereby the control circuit is only re-initialized due to said predetermined number of successive non-occurrences of clock pulses.

30. A circuit as in claim 15 wherein said control circuit is connected to respond to the actual occurrences of pulses in at least one of the pulse streams so as to cause its enabling to follow variations in the periodicity of the bit cells occurring in the composite pulse stream.

31. The circuit of claim 26 further comprising means cooperating with said data window monostable circuit for varying the duration of said data cell time in accordance with the value of the preceding data cell.

32. A data separator circuit for separating into a data pulse stream and a clock pulse stream serially occurring electrical pulses from a composite pulse stream of serially occurring interspersed data and clock pulses, said composite pulse stream including clock pulses normally occurring during time intervals which recur at a regular nominally periodic rate except during a predetermined number of such time intervals wherein such clock pulses may not be present, said data separator circuit comprising:
clock gating means connected to receive said composite pulse stream and to selectively pass pulses therefrom to said clock pulse stream when enabled;
data gating means connected to receive said composite pulse stream and to selectively pass pulses therefrom to said data pulse stream when enabled;
enabling means connected to alternatively enable said clock gating means and said data gating means for predetermined time intervals recurring at said nominally periodic rate;
said enabling means including timing means connected to enable a predetermined one of said clock and data gating means during receipt of a first occurring pulse in the composite pulse stream so as to tentatively define such first occurring pulse and thereafter initiate the alternate recurrent enabling of the clock and data gating means;
said timing means including restart means for restarting the timing means upon receipt of a restart signal and thereafter enabling said predetermined one of the clock and data gating means during receipt of the next successive pulse to occur after a predetermined interval in said composite pulse stream so as to define said next successive pulse and thereafter re-initiate the alternate recurrent enabling of the clock and data gating means; and
clock pulse non-occurrence detecting and counting means connected to receive said clock pulse stream, to detect the absence of clock pulses from said predetermined number of time intervals then assigned thereto by the timing means and, in response to such detection, to provide said restart signal to said restart means, thereby insuring that said data separator circuit remains synchronized with said composite pulse stream.

33. A data separator circuit as in claim 32 wherein said clock pulse non-occurrence detecting and counting means is connected to be decremented for each occurring time interval assigned to said clock pulse stream by said timing means and set to a predetermined number upon the occurrence of each pulse in the clock pulse stream, whereby only said predetermined number of successive non-occurrences of clock pulses are effective to provide said restart signal.

34. A data separator circuit as in claim 32 wherein said timing means includes means for retiming the nominally periodic rate of alternately enabling said clock and data gating means upon the occurrence of the last received pulse from said composite pulse stream.

35. A data separator circuit as in claim 32 wherein said timing means comprises:
a first monostable means having an output connected to cause said data gating means to be enabled for a predetermined maximum interval after being triggered;

a second monostable means having an output connected to cause said clock gating means to be enabled for a predetermined maximum interval after being triggered;

said first monostable means being connected to be triggered in accordance with signals from said clock pulse stream and from an output of said second monostable means;

said second monostable means being connected to be triggered in accordance with signals from said data pulse stream and from said first monostable means; and means for inhibiting at least one of said first and second monostable means upon receipt of said restart signal.

36. The data separator circuit of claim 35 further comprising means cooperating with said first monostable means for varying said predetermined maximum interval in accordance with said data pulse stream.

37. A data separator circuit as in claim 32 wherein said timing means comprises:

a first monostable means having an output connected to cause said data gating means to be enabled for a predetermined maximum interval after being triggered;

a second monostable means having an output connected to cause said clock gating means to be enabled for a predetermined maximum interval after being triggered;

said first monostable means being connected to be triggered by an output from said second monostable means;

said second monostable means being connected to be triggered by an output from said first monostable means; and means for inhibiting at least one of said first and second monostable means upon receipt of said restart signal.

38. The data separator circuit of claim 37 further comprising means cooperating with said first monostable means for varying said predetermined maximum interval in accordance with said data pulse stream.

39. A data separation circuit as in claim 37 wherein said timing means includes retiming means connected to trigger at least one of the first and second monostable means in response to pulses appearing in said clock and data pulse streams respectively.

40. A data separation circuit as in claim 32 wherein said clock pulse non-occurrence detecting and counting means is connected to be incremented with respect to an initial count for each occurring time interval assigned to said clock pulse stream by said timing means and is returned to said initial count upon the occurrence of each pulse in the clock pulse stream, whereby only a predetermined number of successive non-occurrences of clock pulses are effective to provide said restart signal.

41. In a system for receiving a composite signal formed of serial pulses, said pulses occurring in alternating clock and data signal portions of predetermined duration, pulses being absent from no more than a predetermined maximum number of successive ones of said clock signal portions, a circuit for providing separate clock and data pulse streams comprising:

first one-shot means for generating a data window signal of predetermined maximum duration;

second one-shot means for generating a clock window signal of predetermined maximum duration;

gate means, responsive to said composite signal and said data window signal, for alternatively passing the instantaneous composite signal pulse to a separate data channel or a separate clock channel in accordance with said data window signal;

said first one-shot means including means for providing said data window signal to cause said gate means to pass said composite pulses to said data channel during a period beginning with the concurrence of the end of a pulse in said separate clock channel and the absence of said clock window signal, and ending with the first occurring of a pulse in said separate data channel and the running of said predetermined maximum duration;

said second one-shot means including means for providing said clock window signal during a period beginning with concurrence of the absence of said data window signal and the end of a pulse in said separate data channel, and ending with the first occurring of a pulse in said separate clock channel and the running of said predetermined maximum duration;

said circuit further including decoder means, responsive to said separate clock pulse stream, for generating a signal indicative of the occurrence of said maximum number of successive clock signal portions not containing pulses, said decoder signal being applied as a control signal to said second one-shot means to inhibit said second one-shot means until the next successive pulse in said separate clock signal channel.

42. In a system for receiving a composite signal formed of serial pulses of predetermined duration, wherein pulses in alternate portions of said composite signal are respectively indicative of first and second informational categories, pulses being absent from no more than a predetermined number of successive composite signal portions associated with said second informational category, a circuit for providing first and second separate pulse trains respectively representative of said first and second informational categories comprising:

first one-shot means, responsive to control signals applied thereto, for generating a first gate signal of predetermined maximum duration;

second one-shot means, responsive to control signals applied thereto, for generating a second gate signal of predetermined maximum duration;

gate means, responsive to said first gate signal and a signal indicative of said composite signal for selectively generating, in accordance with said first gate signal, first and second separate pulse trains, representative of respectively corresponding composite signal pulses:

said first one-shot means generating said first gate signal in response to the concurrence of a negative going transition in said second pulse train with an absence of said second gate signal, and terminating said first gate signal in response to the first occurring of the next successive positive going transition in said first pulse train and the running of said maximum duration;

said second one-shot means generating, when not inhibited, said second gate signal in response to the concurrence of a negative going transition in said first pulse train with an absence of said first gate signal, and terminating said second gate signal in response to the first occurring of a positive going transition in said second pulse train and the running of said maximum duration, said second one-shot means maintaining said second gate signal absent in response to an inhibit signal applied thereto; and decoder means, responsive to said second pulse train, for generating a signal indicative of the absence of a pulse in said second pulse train for said predetermined number of composite signal portions associated with said second pulse train, said decoder signal being terminated upon the next positive going transition in said second pulse train, said decoder signal being applied to said second one-shot means as an inhibit signal.

43. In a system receptive of a composite signal of serial portions of predetermined duration, wherein the contents of alternate ones of said portions are respectively indicative of first and second informational categories, and a predetermined sequence of logical values occurs exclusively in said second informational category, a circuit for providing first and second separate signals respectively representative of said first and second informational categories comprising:

control means for providing control signals in response to at least one of said first and second separate signals;

first means, normally initialized, responsive to said composite signal and control signals for providing in said first separate signal, pulses corresponding to the first received content of a first predetermined logical value in said composite signal, and thereafter selectively providing in said first separate signal, pulses corresponding to every second composite signal portion content, and for providing in said second separate signal, pulses corresponding to the composite signal portion content next occurring after said first predetermined logical value content and thereafter selectively providing pulses corresponding to every second composite signal portion content;

and counter means responsive to non-occurrences of said first separate signal for generating a signal indicative of a predetermined count of said non-occurrences, said counter means signal being applied to temporarily inhibit said control means, whereby said first means is reinitialized.

* * * * *